US012086270B2

United States Patent
Lu et al.

(10) Patent No.: US 12,086,270 B2
(45) Date of Patent: Sep. 10, 2024

(54) MEDIATING DIRECTED REFRESH MANAGEMENT INDUCED ROW HAMMER AND ROW ACCESS STROBE (RAS) CLOBBER FAILURES

(71) Applicant: Micron Technology, Inc., Boise, ID (US)

(72) Inventors: Yang Lu, Boise, ID (US); Markus H. Geiger, Boise, ID (US); Nathaniel J. Meier, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/166,365

(22) Filed: Feb. 8, 2023

(65) Prior Publication Data

US 2023/0268022 A1    Aug. 24, 2023

Related U.S. Application Data

(62) Division of application No. 18/160,293, filed on Jan. 26, 2023.

(60) Provisional application No. 63/303,550, filed on Jan. 27, 2022.

(51) Int. Cl.
| | |
|---|---|
| G06F 11/00 | (2006.01) |
| G06F 21/55 | (2013.01) |
| G06F 21/57 | (2013.01) |
| G11C 8/18 | (2006.01) |
| G11C 29/02 | (2006.01) |
| G11C 29/50 | (2006.01) |
| G11C 29/52 | (2006.01) |

(52) U.S. Cl.
CPC .......... *G06F 21/577* (2013.01); *G06F 21/554* (2013.01); *G11C 8/18* (2013.01); *G11C 29/022* (2013.01); *G11C 29/50004* (2013.01); *G11C 29/52* (2013.01); *G06F 2221/034* (2013.01); *G11C 2029/5002* (2013.01)

(58) Field of Classification Search
None
See application file for complete search history.

(56) References Cited

U.S. PATENT DOCUMENTS

| | | | |
|---|---|---|---|
| 10,872,654 B1* | 12/2020 | Lee | G11C 11/4085 |
| 2018/0203621 A1* | 7/2018 | Ahn | G11C 7/24 |
| 2019/0228813 A1* | 7/2019 | Nale | G11C 11/4096 |
| 2020/0090729 A1* | 3/2020 | Son | G06F 3/0604 |
| 2020/0152249 A1* | 5/2020 | Kawamura | G11C 7/12 |
| 2021/0065775 A1* | 3/2021 | Hush | G11C 11/408 |

(Continued)

*Primary Examiner* — Mujtaba M Chaudry
(74) *Attorney, Agent, or Firm* — Wood IP LLC; Theodore A. Wood

(57) ABSTRACT

There are provided systems and methods that include at least one memory that has a plurality of memory cells. The cells may be disposed in rows and columns. The device can further include a controller that is communicatively coupled to the at least one memory, and the controller may be configured by its hardware topology and its instruction set and/or by a communicatively coupled processor or higher-level system or subsystem to maintain data integrity in the at least one memory and/or to prevent or mitigate malicious access patterns that may compromise the at least one memory. The controller may be configured to execute a deterministic protocol in conjunction with or sequentially to a probabilistic protocol to achieve one or more of the above-noted functions.

20 Claims, 9 Drawing Sheets

(56) References Cited

U.S. PATENT DOCUMENTS

2021/0109577 A1* 4/2021 Mandava ............ G06F 13/1668
2021/0350835 A1* 11/2021 Murphy ................ G11C 7/065
2021/0406384 A1* 12/2021 Jin ........................... G11C 7/24

* cited by examiner

MEDIATING DIRECTED REFRESH MANAGEMENT INDUCED ROW HAMMER AND ROW ACCESS STROBE (RAS) CLOBBER FAILURES

CROSS-REFERENCE TO RELATED APPLICATIONS

This application is a divisional of U.S. application Ser. No. 18/160,293, filed Jan. 26, 2023, which claims priority to U.S. Provisional Application No. 63/303,550, filed Jan. 27, 2022, the contents of which are hereby incorporated by reference in their entireties.

BACKGROUND

Memory integrity is a hallmark of modern computing. Memory systems are often equipped with hardware and/or software/firmware protocols configured to check the integrity of one or more memory sections. These protocols also determine whether the data located therein is either accessible to higher level subsystems or whether the data is error-free. These methods fall under the reliability, availability, and serviceability (RAS*) features of the memory and are essential for maintaining data persistence in the memory as well as data integrity. (The asterisk is to disambiguate with row access strobe (RAS), used herein below).

The typical RAS* infrastructure of a memory system may be configured to detect and fix errors in the system. For example, RAS* features may include protocols for error-correcting codes. Such protocols are hardware features that can automatically correct memory errors once they are flagged by the RAS* infrastructure. These errors may be due to noise, cosmic rays, hardware transients due to sudden changes in power supply lines, or physical errors in the medium in which the data are stored.

Another source of errors may originate from network attacks or a malicious application that aims to corrupt the data in the memory. For example, one security exploit is the Row Hammer (RH) attack which relies on undesirable side effects that are inherent to the architecture of some memories, like dynamic random-access (DRAM) memory cells, for example.

Densely packed DRAM cells have weak electrical isolation between them, and thus, interact by leaking charges, possibly flipping a data bit in a cell if the amount of leaked charges absorbed by that cell exceeds a set logic threshold. In RH attacks, a malicious application or network attacker can craft special memory access patterns that rapidly activate the same memory rows, effectively triggering adverse charge leakage processes that eventually corrupt the data in adjacent sections of the memory. This problem is further accentuated with the advent of ever smaller feature sizes as complementary metal-oxide-semiconductor (CMOS) processes are continually scaled down and DRAM modules become more dense.

Yet another pattern that can trigger charge leakage in memory cells consists of the so-called row access strobe (RAS) clobber process. In this process, a word line is kept on for an extended duration to cause stress to adjacent word lines. RAS clobber processes can be used to test a memory's integrity, but they may organically arise during operation.

With the advent Compute Express Link (CXL), RAS clobber and RH risks are also significantly amplified, even when considering normal operation, i.e., without the memory being subjected to any malicious processes or undergoing integrity testing. CXL is a protocol based on an open industrial standard that features cache-coherent interconnect for processors, memory expansion, and accelerators. This protocol maintains memory coherency between central processor unit (CPU) dedicated memory banks and memory systems of peripheral devices communicatively-coupled to the CPU of a processor. This technology can allow resource sharing and reduced software stack complexity, which improves device speed and reduces overall system cost.

CXL offer extremely low communication latency, and thus, high bandwidth. Therefore, in addition to memory density causing an increased risk of failure or data corruption due to a lack of electrical isolation, new protocols such as CXL can cause native applications to naturally request and access memories with frequencies and patterns that may trigger adverse leakage effects. As such, there is a need for hardware systems and methods for identifying and mitigating failures originating from memory access patterns, like the ones discussed above.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

As an example, platform for which the embodiments are advantageous, and not by limitation, we consider a DRAM. As DRAM geometries shrink, RH and RAS* clobber cell degradation risk increase. Due to lowered data retention and high bandwidth access capabilities, even regular application code can mimic malicious behaviors.

Current RH refresh (RHR) and RAS clobber solutions such as address sampling (AS) and priority content addressable memory (CAM) do not guarantee perfect (i.e., complete) prevention of data corruption in all scenarios. This is because these solutions are probabilistic, and as such, they have no clear paths to scale and become deterministic.

Furthermore, even though in area-optimized RH solutions that are embodied in a memory controller and revised Misra-Grise algorithms cover the native RH+/−1 risk deterministically, they do not cover RH 2/3/4 risk caused by directed refresh management (DRFM) commands. These deterministic methods do not cover RAS clobber risk either. This means that an aggressor may determine sufficient mitigation details and successfully corrupt the DRAM data.

The embodiments featured herein help solve or mitigate the above noted issues as well as other issues known in the art. Under certain circumstances, an exemplary embodiment includes a memory device having at least one memory that has a plurality of memory cells. The cells may be disposed in rows and columns. The device can further include a controller that is communicatively coupled to the at least one memory, and the controller may be configured by its hardware topology and its instruction set and/or by a communicatively coupled processor or higher-level system or subsystem to maintain data integrity in the at least one memory and/or to prevent or mitigate malicious access patterns that may compromise the at least one memory. The controller may be configured to execute a deterministic protocol in conjunction with or sequentially to a probabilistic protocol to achieve one or more of the above-noted functions.

In the event the RAS counter is greater than the RAS clobber counter threshold (RCCT), the operations can include triggering another row activation command for a second row (ACT+1) and setting the RAS counter to zero, and subsequently incrementing the RAS counter at another edge of the clock.

Figure 1:
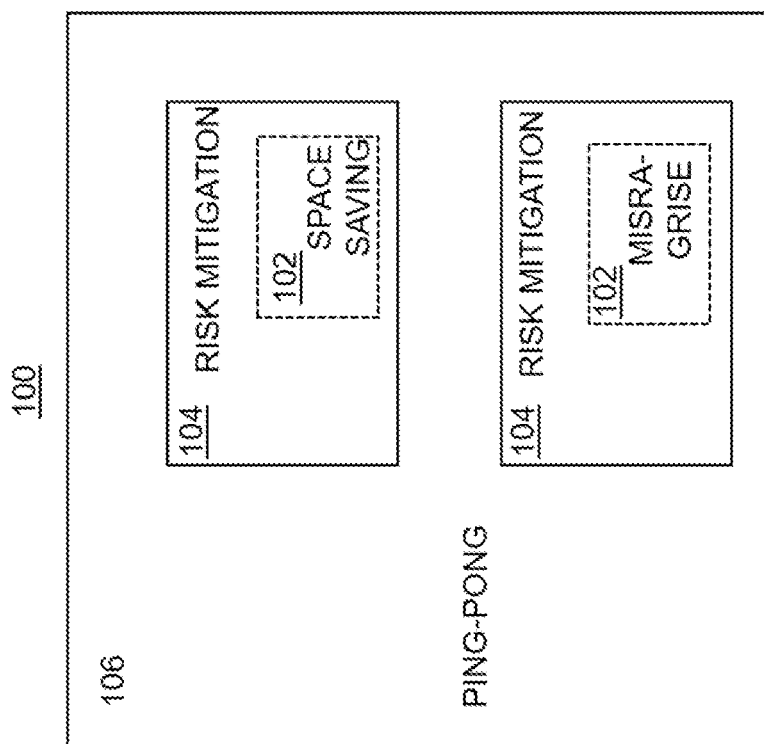
FIG. 1 illustrates a RAS clobber and RH mitigation process according to an aspect of an embodiment.

FIG. 1 illustrates a RAS clobber and RH mitigation process 100 according to an aspect of an embodiment. The process 100 may be executed by a controller configured to maintain data integrity in a memory. As such, it configures the controller with a specific structure that imparts application-specific functions to the controller.

The process 100 may include a plurality of algorithms, which may be protocols that include a set of operations undertaken by the controller during execution. The process 100 provides a combined solution for mitigating total RH and RAS clobber risks, which may be modes of failures of the memory. The process 100 can include a base protocol 102 which may be a CAM/counter protocol.

The CAM protocol may be based on a Period Activity Tracking and/or a DRFM servicing protocol that deterministically manages native RH risks. The base protocol 102 may further include, by example and without limitation, a Space Saving (SS) RH algorithm or a revised Misra-Grise RH algorithm, a lockout SS RH algorithm, or the like, which may be probabilistic algorithms that are configured to manage native risks.

The process 100 can further include a deterministic risk mitigation algorithm (RMA) 104 that runs in conjunction with or sequentially to the base protocol, partly or in whole, with the base protocol 102. Without loss of generality, the process 100 can be embodied by multiple instances of the RMA 104/base protocol 102, depending on the number of memory banks serviced by the controller, as shown in FIG. 1.

The RMA 104/base protocol 102 may further have a PING-PONG protocol 106 running in conjunction with or sequentially to the RMA 104/base protocol 102 combination, partly or in whole. The PING-PONG protocol works on top of the RMA 104 to provide a reset mechanism for the RMA 104 in order to ensure that the RMA 104 can work with infinite data streams. It is noted that the SS algorithm of the base protocol 102 is a core algorithm configured to solve row activation counting and can only handle finite data streams. Generally, the RMA 104 works on top of the SS algorithm of the base protocol 102 to manage RH, RAS clobber, and DRFM activities.

Figure 2:
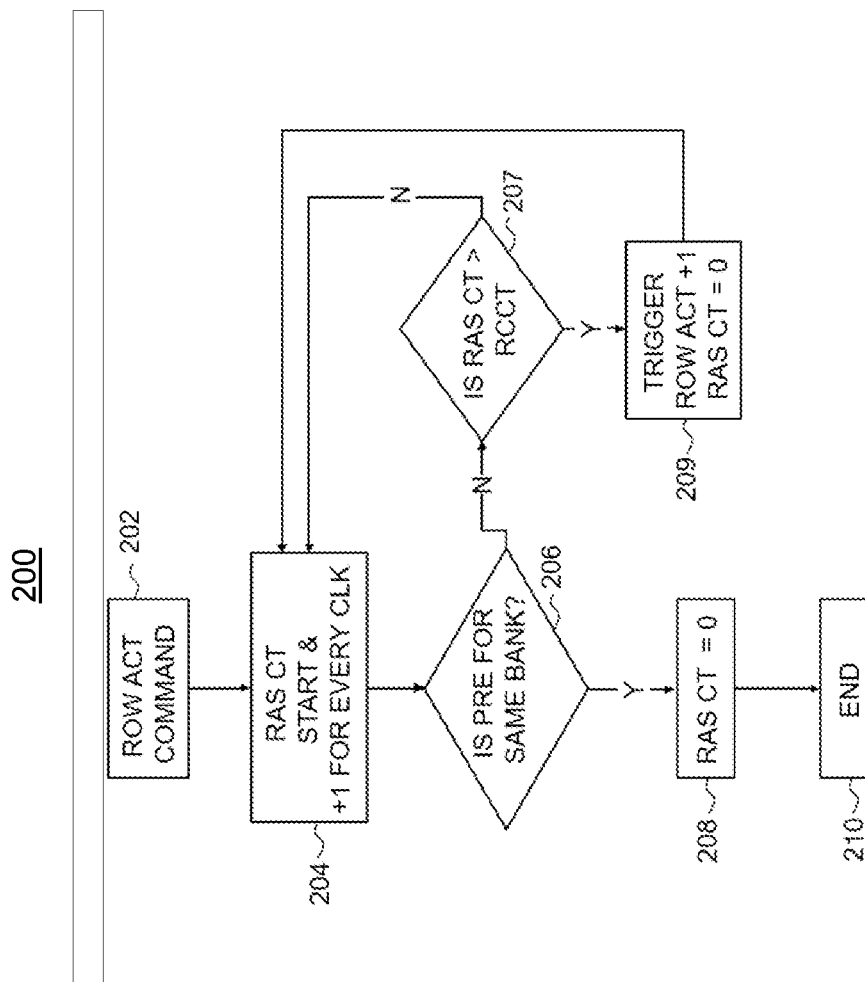
FIG. 2 illustrates a feature of an RCCT process according to an aspect of an embodiment.

FIG. 2 illustrates a method 200, which is a process or protocol that may be executed by a controller configured to maintain data integrity in a memory communicatively coupled thereto. The method 200 may be embodied in a set of instructions that impart a specific structure to the controller, causing it to perform certain operations that achieve the above noted task. The method 200 can begin with the controller receiving a row activation (ACT) command at block 202. In response to receiving the command, at block 204, the method includes starting a RAS counter and incrementing this counter by +1 at every clock cycle, which may be for example, the next rising (or falling) edge of the system's clock, the system being the memory and its peripheral hardware.

At block 206, the method 200 may further include determining whether a pre-charge (PRE) command has been received for a given memory bank. In response to the PRE command having been received, the method 200 can include setting the RAS counter to zero (block 208) and ending at block 210.

In response to not receiving the PRE command, the method 200 can include determining whether the RAS counter has a value that is greater than a predetermined RCCT threshold (block 207). If the RAS counter value is greater than the RCCT, the method 200 can include, at block 209, triggering a row activation command of a subsequent row (ROW ACT+1) and setting the RAS counter to zero and reverting to block 204. Conversely, that is, if the RAS counter is less than or equal to the RCCT, the method 200 can revert to block 204.

Figure 3:
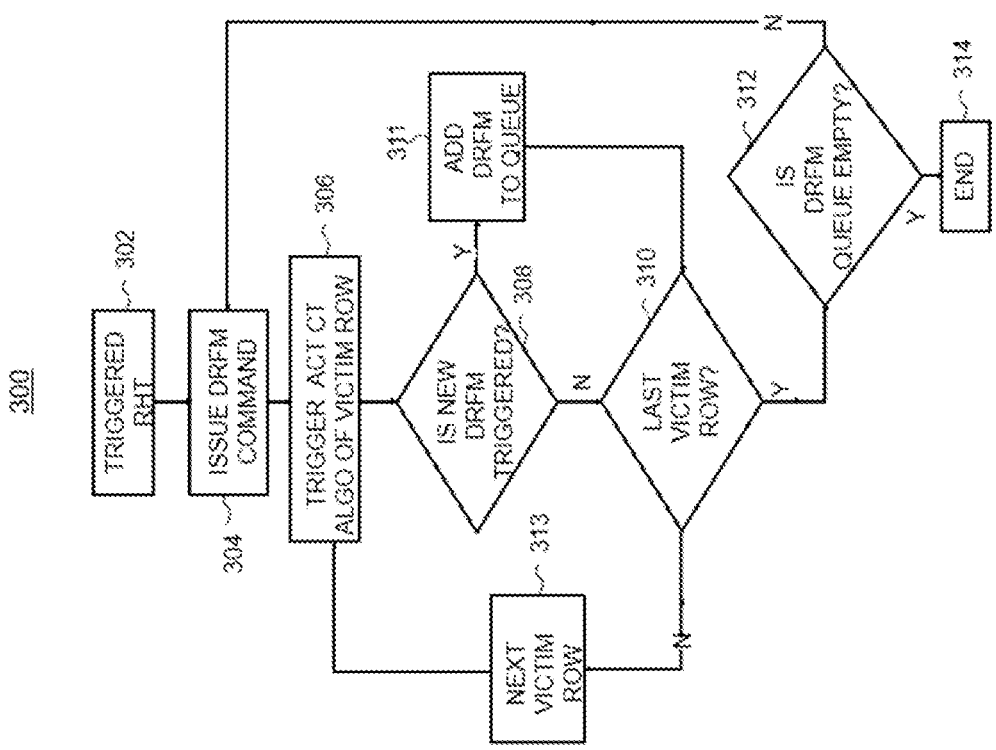
FIG. 3 illustrates another feature of an RCCT process according to an aspect of an embodiment.

FIG. 3 illustrates a method 300, which is a process or protocol that may be executed by a controller configured to maintain data integrity in a memory that it is communicatively coupled to. The method 300 may be embodied in a set of instructions that impart a specific structure to the controller, causing it to perform certain operations that achieve the above noted task. The method 300 can begin with the controller receiving an indication that a RH threshold (RHT) has been triggered (block 302). The method 300 can then cause a DRFM command to be issued (block 304) which then triggers an ACT counter and a base protocol algorithm for a victim row (block 306). It is noted that issuing the DRFM may cause the ACT count to increment to 2-4 or even more victim row counters.

The method 300 can include determining whether a new DRFM command has been triggered (block 311). If a new DRFM command is not triggered, it is determined whether the victim row registered was the last victim row (block 310). If a new DRFM command is triggered, the DRFM command may be added to a queue for execution (block 311) prior to block 310.

If the victim row is the last victim row, the method 300 can include further determining whether the DRFM queue is empty (block 312). If the queue is empty, the method 300 ends at block 314. If not, the method 300 reverts to block 304. Furthermore, if the victim row was not the last victim row, at block 310, the method 300 moves to block 313 to detect the next victim row and revert to block 306.

Figure 4:
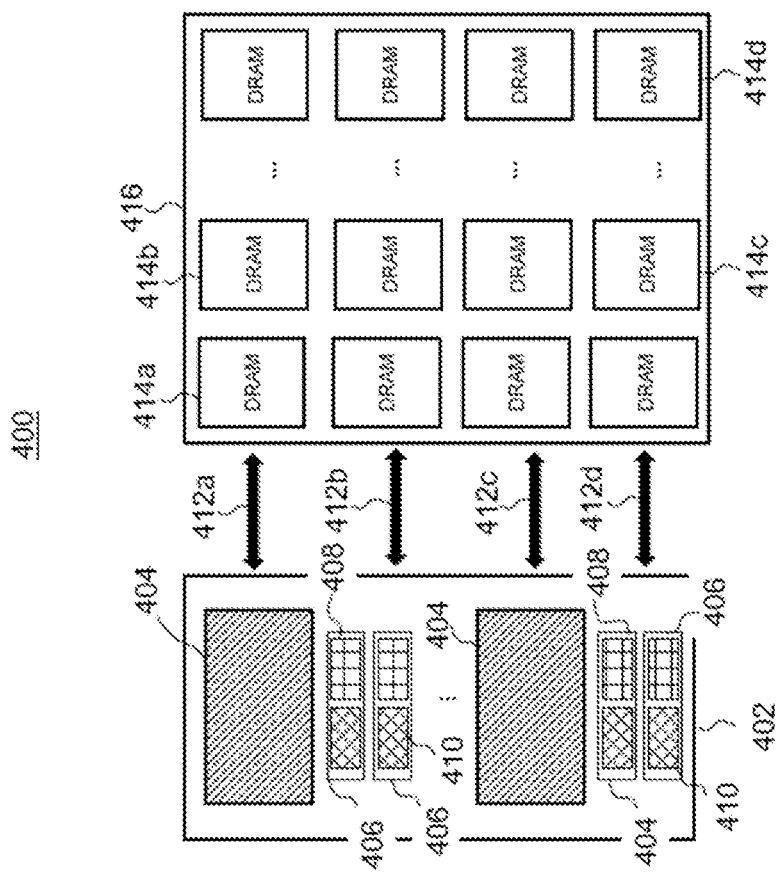
FIG. 4 illustrates an architecture according to an aspect of an embodiment.

FIG. 4 depicts an architecture 400 according to an embodiment. The architecture 400 can include a memory device that includes a module 402 that features a plurality of controllers 404, each being configured to maintain data integrity in a memory 416. The module 406, and thus the controllers 404, may be communicatively coupled to the memory 416 via one or more links (e.g., 412a-d). These links may be data buses, implemented utilizing protocols known in the art. Furthermore, co-location of the memory 416 and the module 402 is shown for ease of description, but in some embodiments these two elements need not be co-located.

The module 402 can further include sets of tables 406 which include various counters that track the state of RH, RAS clobber and DRFM events and mitigation activities. For example, and not by limitation, the set of tables 406 can include media tables (modules) 410 and ACT count tables 408. Furthermore, generally, the memory 416 can include a plurality of memory elements, which may, for example and not by limitation, DRAMs. Without limitation, these memory elements and their corresponding controllers 404 may be low power (LP)5/LP5A memory technologies.

Figure 5:
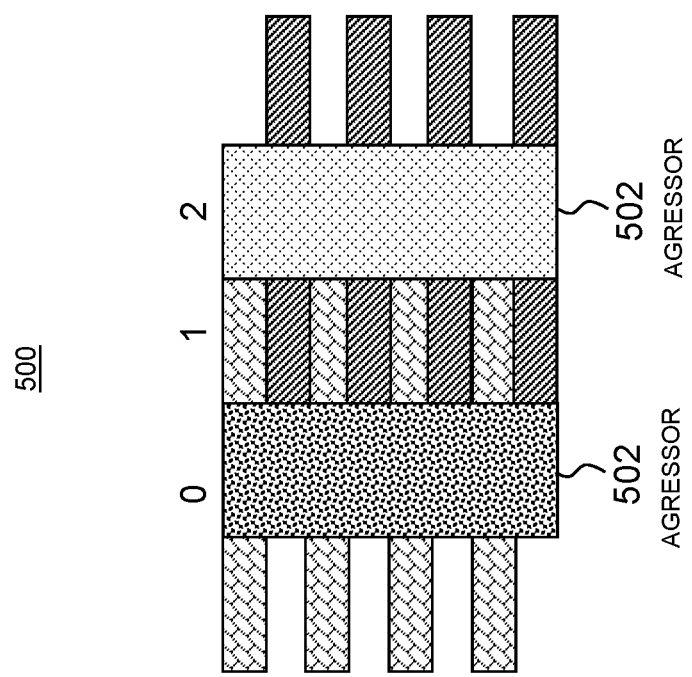
FIG. 5 illustrates an RH1 risk profile according to an aspect of an embodiment.

FIG. 5 illustrates a dominant RH 1 risk profile 500. In the risk profile 500, a passing world line (PWL) on RH+/−1 is a dominant RH risk. A double-sided attack from aggressors 502, i.e., adjacent rows (0, 2) to the victim row (1), will cause accumulation on different cells with no overlap. In this scenario, a logic 0 can flip to 1, so the risk profile 500 does not overlap with RAS clobber-induced failures. As such, the RMA 104 above can cause the controller to serve a DRFM protocol to RH+/−1 when an aggressor row counter reaches an RHT1$p$ level, i.e., a pre-determined threshold for such events.

Figure 6:
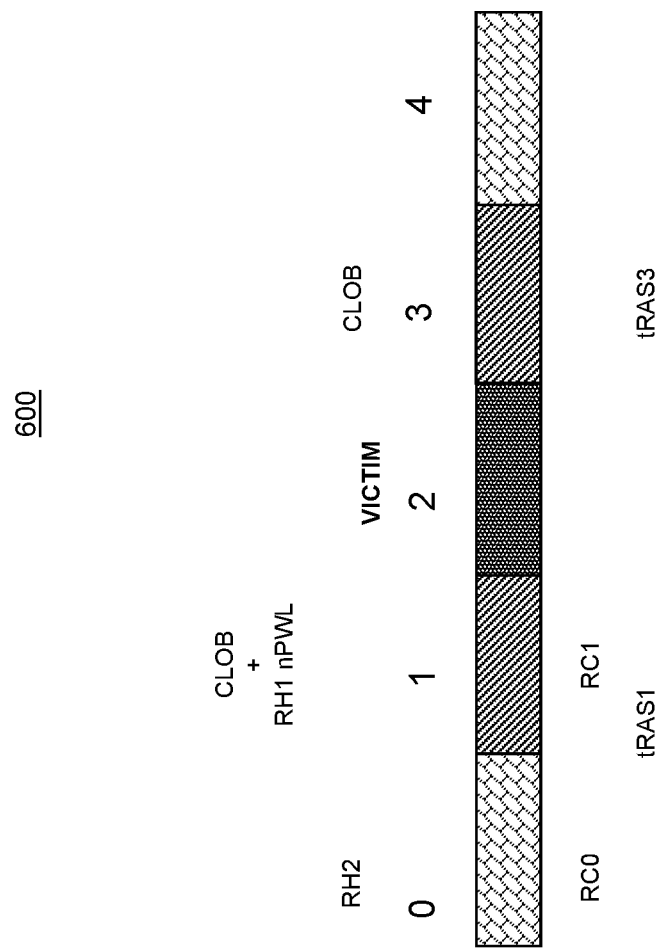
FIG. 6 illustrates RH1, RH2, and RAS clobber risk profiles according to an aspect of an embodiment.

FIG. 6 illustrates a least dominant RH 1, RH 2, and RAS clobber risk profile 600. In the risk profile 600, a non-passing word line (nPWL) is a less dominant RH1 risk. It can overlap with a RH2 and RAS clobber failure. For instance, the RAS clobber may be double sided. For the RH2, the mechanism of failure is known and is from PWL only, so it does not overlap with a double-sided RAS clobber failure around the victim row. The times tRAS1 and tRAS3 are provided to the RMA 104 during execution and counters RC0 and RC1 are incremented when their associated failures (RH2 and RH1 nPWL+RAS clobber) are registered.

Figure 7:
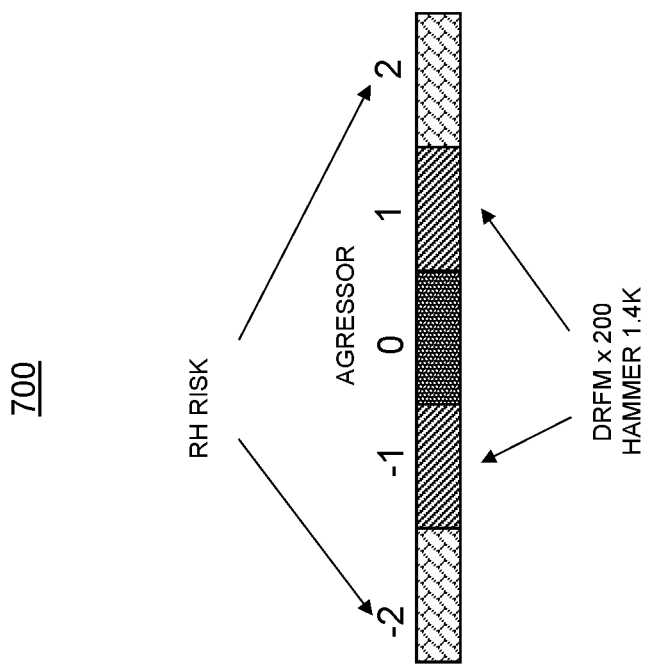
FIG. 7 illustrates a DRFM service-induced RH risk profiles according to an embodiment.
Figure 8:
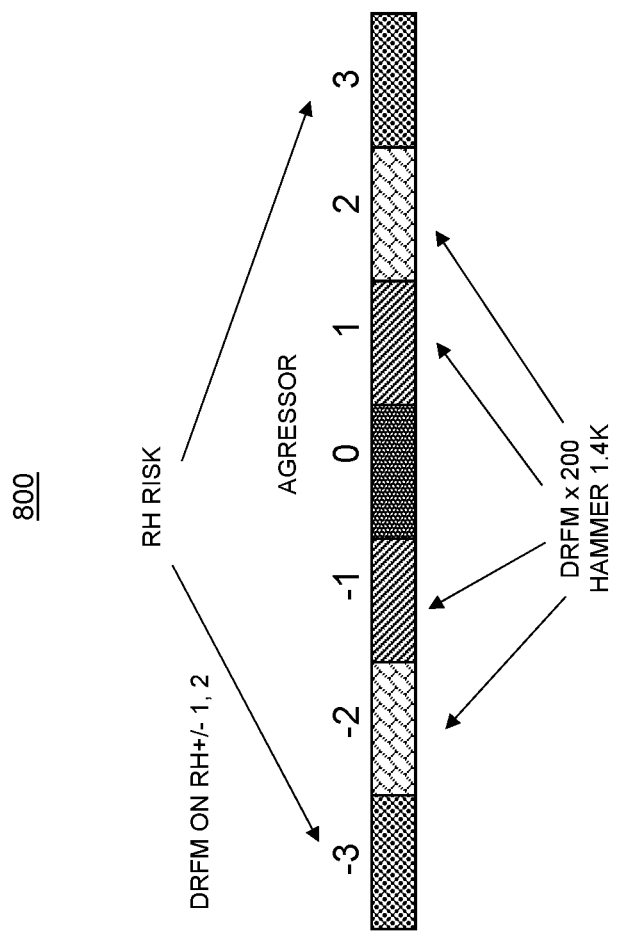
FIG. 8 illustrates another DRFM RH risk profile according to an embodiment.

FIGS. 7 and 8 illustrate DRFM service-induced RH risks, i.e., an inverse hammer risk profiles 700 and 800. In these risk profiles, the DRFM consists of ACT/PRE cycles, which if issued frequently on the same address, can cause a row hammer event in a neighboring row. As such, in each case, these are factored in the ACT counts of the RMA 104 (e.g., when executing the method 300).

Figure 9:
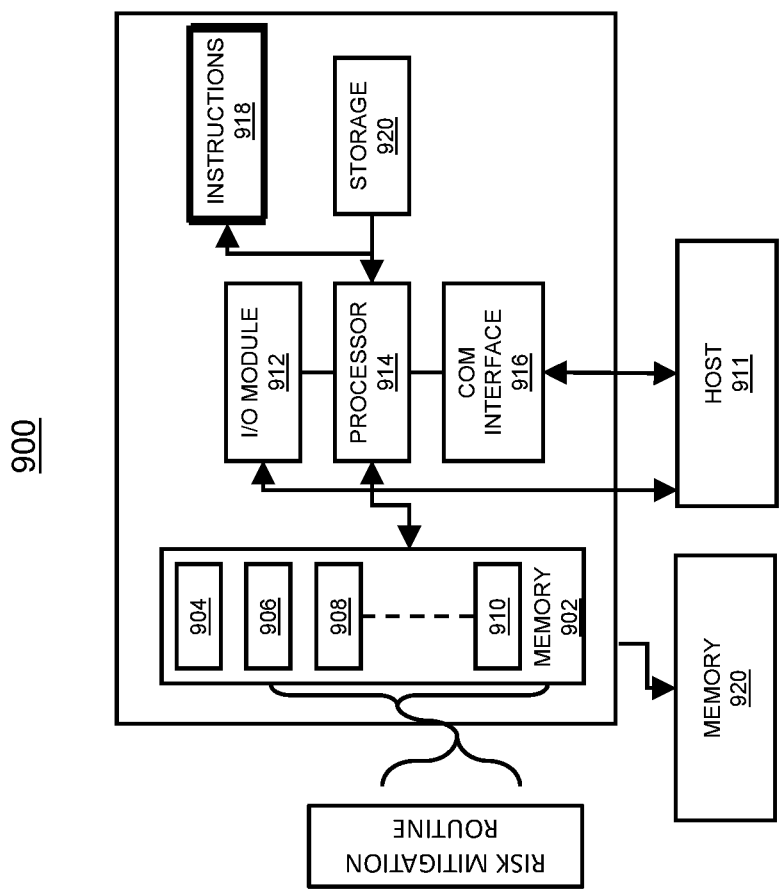
FIG. 9 illustrates a controller according to an embodiment.

FIG. 9 illustrates a controller 900 according to an embodiment. The controller 900 may be an embodiment of one of the controllers 404 discussed above. It is noted that the components shown in the controller 900 are not an exhaustive list of components that may be included in the controller 900 nor are they required to be co-located as shown in FIG. 9 to impart the functions of the controller 900 that are described below and throughout this disclosure.

Furthermore, the controller 900 may be an application-specific hardware, software, and/or firmware implementation of the controller 404 described above. The controller 900 can include a processor 914 which may be communicatively coupled to a host 911 via a communication interface 916. The host 911 may provide instructions 918 to the processor 914 for execution or said instructions 918 may be included in a storage medium 920.

The processor 914 can have a specific structure. The specific structure can be imparted to the processor 914 by instructions stored in a memory 902 and/or by instructions 918 fetchable by the processor 914 from the storage medium 920. The storage medium 920 may be co-located with the controller 900 as shown, or it can be remote and communicatively coupled to the controller 900. As configured by its instructions, the controller 900 may perform one or more risk mitigation routines to maintain the integrity of a memory 920 to which it is communicatively coupled. Such coupling may be via a bus or via a communication link established by a CXL protocol.

The one or more risk mitigation routines can include protocols like the method and operations discussed above and throughout this disclosure. For example, and not by limitation, the one or more risk mitigation routines can include the method 200, the method 300, and/or any other operations consistent with the previously described embodiments.

The controller 900 can be a stand-alone programmable system, or a programmable module included in a larger system. For example, the controller 900 can be included in RAS* hardware infrastructure for maintaining the integrity of the memory 920. The controller 900 may include one or more hardware and/or software components configured to fetch, decode, execute, store, analyze, distribute, evaluate, and/or categorize information.

The processor 914 may include one or more processing devices or cores (not shown). In some embodiments, the processor 914 may be a plurality of processors, each having either one or more cores. The processor 914 can execute instructions fetched from the memory 902, i.e., from one of memory modules 904, 906, 408, or 410. Alternatively, the instructions can be fetched from the storage medium 920, or from a remote device connected to the controller 900 via a communication interface 916.

Without loss of generality, the storage medium 920 and/or the memory 902 can include a volatile or non-volatile, magnetic, semiconductor, tape, optical, removable, non-removable, read-only, random-access, or any type of non-transitory computer-readable computer medium. The memory 920 can include a plurality of memory cells wherein the cells are disposed in rows and columns. The storage medium 920 and/or the memory 902 may include programs and/or other information usable by processor 914. Furthermore, the storage medium 920 can be configured to log data processed, recorded, or collected during the operation of controller 900.

The data may be time-stamped, location-stamped, cataloged, indexed, encrypted, and/or organized in a variety of ways consistent with data storage practice. By way of example, the memory modules 906 to 910 can form the previously described failure mitigation protocols. The instructions embodied in these memory modules can cause the processor 914 to perform certain operations consistent with the functions described above, i.e., the mitigation of Row Hammer and RAS clobber faults occurring at one or more locations in the memory 920.

Having described several exemplary embodiments in detail, additional embodiments are now described generally to further enable one of ordinary skill in the art to apply to the teachings of this present disclosure. There are provided embodiments that include methods, devices, hardware, firmware, software, and/or combinations thereof. These embodiments include application-specific hardware configured to execute instructions and perform operations that provide the many advantages conferred by the teachings of the present disclosure.

For instance, there is provided a first exemplary embodiment that includes a memory device that includes at least one memory that has a plurality of memory cells. Without limitation, but by example, the cells may be disposed in rows and columns. The device can further include a controller communicatively coupled to at least one memory. The controller may be configured by its hardware topology and its instruction set and/or by a communicatively coupled processor or higher-level system or subsystem to maintain data integrity in the at least one memory and/or to prevent or mitigate malicious access patterns that may compromise the at least one memory.

The controller may be configured to execute a deterministic protocol in conjunction with or sequentially to a probabilistic protocol to achieve one or more of the above-noted functions. The controller may be configured to reset or reinitialize one or more protocols to operate with infinite data streams. Further, at least one memory may be, for example and not by limitation, a DRAM.

In this first embodiment, the controller may achieve one or more of the above-noted functions by executing a deterministic protocol in conjunction with or sequentially to a probabilistic base protocol, the latter being configured for native failure risk mitigation. The base protocol may be configured to mitigate one or more failure risks. These failure risks may include a RH risk failure, a RAS clobber risk failure, and a DRFM failure. The controller may execute a deterministic protocol that is configured to mitigate a RH1 risk (+/1 rows), a RH2 risk (+/−2 rows), a RAS clobber risk, and an inverse hammer risk, the latter being induced by a DRFM protocol. The inverse hammer risk may consist of an RH/3/4 (+/−3, 4) risk.

The base protocol may include one or more protocols. For example, the base protocol may include an RHR protocol, an AS protocol, an AT protocol, and/or a CAM protocol. Furthermore, the base protocol may include at least one of an SS RH protocol, a Ping-Pong protocol, a revised Misra-Grise RH protocol, and a lockout SS RH protocol. The base protocol may further include a native deterministic RH risk mitigation protocol, which may be, by example and not by limitation, a protocol that is based on a DRFM servicing protocol.

In a second embodiment, there is provided a method for mitigating risk of failure in a memory device including at least one memory. The method can include executing, by a controller, certain operations configured to maintain data integrity in at least one memory. These operations can include executing a deterministic risk mitigation protocol in conjunction with or sequentially to a base protocol for native risk mitigation, the base protocol including a probabilistic risk protocol. The memory device can comprise a DRAM.

In this method, the base protocol is configured to mitigate a risk of failure selected from the set of risk of failures consisting of an RH risk failure, a RAS clobber risk failure, and a DRFM failure. For a RH risk failure, the deterministic protocol may be configured to mitigate a RH1 risk (+/1 rows), a RH2 risk (+/−2 rows), a RAS clobber risk, and an inverse hammer risk which may be a DRFM-induced RH failure risk consisting of a RH/3/4 (+/−3, 4) risk. Furthermore, in this method, the base protocol can include an RHR protocol, an AS protocol, an AT protocol, and/or a CAM protocol. Generally, the base protocol can include a native deterministic RH risk mitigation protocol.

In yet another embodiment, the controller (noted above) can be configured to maintain data integrity and/or prevent or mitigate adverse attacks or access/request behaviors that may compromise the integrity of the data in at least one memory. The controller can achieve one or more of the above-noted functions by executing certain operations.

These operations can include receiving an ACT command and starting a RAS counter and incrementing said RAS counter in a subsequent instance of an edge of a clock. The operations can further include determining if a PRE command has been received for the same row, and if said PRE command has been received, setting the RAS counter zero.

Further, if said PRE command was not received, the operations include determining whether the RAS counter is greater than an RCCT. In the event the RAS counter is greater than the RCCT, the operations can include triggering another row activation command for a second row (ACT+1) and setting the RAS counter to zero, and subsequently incrementing the RAS counter at another edge of the clock.

The memory device in this additional embodiment can include a DRAM, and the controller may be further configured to execute a base protocol that includes a probabilistic protocol. The base protocol can be configured to mitigate a native failure risk of at least one memory. Further, the base protocol may include one or more protocols. For example, the base protocol may include an RHR protocol, an AS protocol, an AT protocol, and/or a CAM protocol.

Furthermore, the base protocol may include at least one of a SS RH protocol, a Ping-Pong protocol, a revised Misra-Grise RH protocol, and a lockout SS RH protocol. The base protocol may further include a native deterministic RH risk mitigation protocol, which may be, by example and not by limitation, a protocol that is based on a DRFM servicing protocol.

In a method of this additional embodiment, the memory device can include a DRAM, and the operations can further include executing a base protocol to mitigate a risk of failure selected from the set of failure risks consisting of an RH failure risk, and a RAS Clobber failure risk. Generally, the base protocol can be configured to mitigate a native failure risk of at least one memory. Further, the base protocol may include one or more protocols. For example, the base protocol may include an RHR protocol, an AS protocol, an AT protocol, and/or a CAM protocol.

Furthermore, the base protocol may include at least one of an SS RH protocol, a Ping-Pong protocol, a Revised Misra-Grise RH protocol, and a lockout SS RH protocol. The base protocol may further include a native deterministic RH risk mitigation protocol, which may be, by example and not by limitation, a protocol that is based on a DRFM servicing protocol. Further, generally, the controller may be configured to mitigate failure risks deterministically in conjunction with or sequentially to addressing native failure risks using a probabilistic mitigation protocol.

In yet another embodiment, there is provided a memory device that includes at least one memory including a plurality of memory cells. By example, and not by limitation, the cells may be arranged in a matrix format, i.e., in rows and columns. The memory device can further include a controller coupled to at least one memory and that is configured to maintain data integrity in the at least one memory by executing certain operations. The operations can include receiving an indication that a RHT has been exceeded and issuing a first DRFM command.

The operations can further include triggering an ACT for at least one victim row counter wherein the at least one victim row counter is associated with at least one row that is affected by a row hammer event. The operations can further include executing a base protocol to mitigate the row hammer event and in response to a new DRFM command being triggered, the operations can include adding a DRFM mitigation protocol to a queue for execution. The operations can further include determining the most recent victim row of the new DRFM command and if the queue is empty, issuing the first DRFM command.

The memory device in this embodiment can include a DRAM, and the controller may be further configured to execute a base protocol that includes a probabilistic protocol. The base protocol can be configured to mitigate a native failure risk of at least one memory. Further, the base protocol may include one or more protocols. For example, the base protocol may include an RHR protocol, an AS protocol, an AT protocol, and/or a CAM protocol.

Furthermore, the base protocol may include at least one of an SS RH protocol, a Ping-Pong protocol, a revised Misra-Grise RH protocol, and a lockout SS RH protocol. The base protocol may further include a native deterministic RH risk mitigation protocol, which may be, by example and not by limitation, a protocol that is based on a DRFM servicing protocol.

The embodiments described herein provide deterministic solutions for RH risk caused by DRFM processes serving different (RH3/RH4) scenarios. When no or less quantity of a die is shared with the same RH mitigation counter scheme at the controller, the count DRFM serviced row (RH+/−1) as ACT count can be used to solve the DRFM hammer risk. The controller can determine RH+/−1 with a built-in address map, and DRFM requests only need to serve native RH risks, which are RH+/−1. When more than one die share the same RH mitigation counter scheme at the controller, the embodiments can calculate CAM size with the worst DRFM service number in terms of their RH threshold.

The embodiments also provide deterministic solution for RAS clobber with Row hammer events. They can be tracked with specific counters. For example, the RMA 104 can have a tRAS (row open time) timer for current ACT commands. The tRAS timer can start courting when an ACT command is received.

The timer will stop when a PRE command issued and reset during tRP. The RCCT is used to convert the tRAS time to ACT count which will be counted in row hammer counter. Furthermore, the DRFM trigger threshold will be adjusted to consider both RH and RAS clobber. The embodiments provide flexibility to reduce the DRFM latency by half on most DRFM services with different triggers for RH1 and RH2.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:
1. A memory device comprising:
    at least one memory including a plurality of memory cells disposed in rows and columns; and
    a controller, communicatively coupled to the at least one memory, the controller maintaining data integrity in the at least one memory by executing operations comprising:
    receiving an indication that a row hammer threshold (RHT) has been exceeded;
    issuing a first directed refresh management (DRFM) command;
    triggering an activation command (ACT) for at least one victim row counter, the at least one victim row counter being associated with at least one row affected by a row hammer event;
    executing a base protocol to mitigate the row hammer event;
    adding a DRFM mitigation protocol to a queue for execution in response to a new DRFM command being triggered;
        determining a most recent victim row of the new DRFM command; and
    issuing the first DRFM command if the queue is empty.

2. The memory device of claim 1, wherein the memory device comprises a DRAM.

3. The memory device of claim 1, wherein the base protocol includes a probabilistic protocol configured to mitigate a native risk of failure of the memory.

4. The memory device of claim 1, wherein when controller is configured to mitigate a RH1 risk (+/1 rows), a RH2 risk (+/−2 rows), and a RAS clobber risk as risk of failure of the memory.

5. The memory device of claim 2, wherein the base protocol includes at least one of a RH refresh (RHR) protocol, an address sampling (AS) protocol, and a content addressable memory (CAM) protocol.

6. The memory device of claim 2, wherein the base protocol includes an activity tracking (AT) protocol.

7. The memory device of claim 1, wherein the base protocol further includes a native deterministic RH risk mitigation protocol.

8. The memory device of claim 7, wherein the native deterministic RH risk mitigation protocol is based on a DRFM servicing protocol.

9. The memory device of claim 1, wherein the base protocol includes at least one of a space saving (SS) RH protocol, a Revised Misra-Grise RH protocol, and a lockout SS RH protocol.

10. The memory device of claim 1, wherein the base protocol includes a Ping-Pong protocol.

11. A method for mitigating risk of failure in a memory device including at least one memory, the method comprising:
    executing, by a controller configured to maintain data integrity in the at least one, operations comprising:
    receiving an indication that a Row Hammer Threshold (RHT) has been exceeded;
    issuing a first directed refresh management (DRFM) command;
    triggering an activation command (ACT) for at least one victim row counter, the at least one victim row counter being associated with at least one row affected by a row hammer event;
    executing a base protocol to mitigate the row hammer event;
    adding a DRFM mitigation protocol to a queue for execution in response to a new DRFM command being triggered; and
    determining a most recent victim row of the new DRFM command and if the queue is empty, issuing the first DRFM command.

12. The method of claim 11, wherein the memory device comprises a DRAM.

13. The method of claim 11, wherein the operations further include: executing the base protocol to mitigate a risk of failure selected from the set of failure risks consisting of a Row Hammer (RH) failure risk, and a RAS Clobber failure risk.

14. The method of claim 13, wherein when the failure risk is a RH failure risk, the deterministic protocol is configured to mitigate a RH1 risk (+/1 rows), a RH2 risk (+/−2 rows), a RAS clobber risk, and an inverse hammer risk.

15. The method of claim 14, wherein the inverse hammer risk is a DRFM-induced RH failure risk consisting of a RH/3/4 (+/−3, 4) risk.

16. The method of claim 13, wherein the base protocol includes at least one of a RH refresh (RHR) protocol, an address sampling (AS) protocol, and a content addressable memory (CAM) protocol.

17. The method of claim 13, wherein the base protocol includes an activity tracking (AT) protocol.

18. The method of claim 11, wherein the base protocol includes further includes a native deterministic RH risk mitigation protocol; and wherein the controller is configured is configured to mitigate failure risks deterministically.

19. The method of claim 13, wherein the controller is configured is configured to mitigate failure risks deterministically in conjunction with addressing native failure risks using a probabilistic mitigation protocol.

20. A non-transitory computer readable medium having stored thereon computer executable instructions that, if executed by a computing device, cause the computing device to perform a method for mitigating risk of failure in a memory device including at least one memory, the method comprising:

executing, by a controller configured to maintain data integrity in the at least one, operations comprising:

receiving an indication that a Row Hammer Threshold (RHT) has been exceeded;

issuing a first directed refresh management (DRFM) command;

triggering an activation command (ACT) for at least one victim row counter, the at least one victim row counter being associated with at least one row affected by a row hammer event;

executing a base protocol to mitigate the row hammer event; adding a DRFM mitigation protocol to a queue for execution in response to a new DRFM command being triggered; and determining a most recent victim row of the new DRFM command and if the queue is empty, issuing the first DRFM command.

* * * * *